Reissued Dec. 23, 1924. Re. 15,973

UNITED STATES PATENT OFFICE.

FRANK E. BACHMAN, OF PORT HENRY, NEW YORK.

TITANIUM COMPOUND AND ITS MANUFACTURE.

No Drawing. Original application filed March 28, 1919, Serial No. 285,873. Renewed September 4, 1923. Original No. 1,489,417, dated April 8, 1924. Application for reissue filed October 29, 1924. Serial No. 747,703.

*To all whom it may concern:*

Be it known that I, FRANK E. BACHMAN, a citizen of the United States, residing at Port Henry, county of Essex, and State of New York, have invented a new and useful Improvement in Titanium Compounds and Their Manufacture, of which the following is a full, clear, and exact description.

The present invention relates to certain titanium compounds and their manufacture. These compounds which may be either the end products or intermediate products in the process are titanium compounds resembling metatitanic acid.

The object of the invention is to produce a product of the character described economically and in a substantially pure condition.

In the following description the process is outlined beginning with the raw titanium bearing ore and ending with the final purified product, which is a soft impalpable opaque white powder which resembles metatitanic acid and titanium dioxide, but apparently differs from metatitanic acid in containing less combined water and from pure titanic dioxide, in that it contains some combined water, is free of grit and is more readily soluble in sulphuric acid. It is to be understood, however, that the process is not limited to the entire sequence of steps from the raw ore to the final product, but that a fewer number of steps may be employed. For example, the steps of purification of the titaniferous precipitate thrown down by boiling the titaniferous solution, may be employed in purifying such titaniferous precipitate produced by other methods than that constituting the preliminary steps herein specifically described. Also some of the steps of purifying the titanium compounds may be omitted.

The present invention is not limited to the final end product herein described and its preparation, but may be employed in the production of the so-called intermediate products herein described, which of themselves are articles of manufacture and which may be considered as the final products in case their production is desired.

The process of the present invention will be first outlined beginning with the raw material or ore, then the process and the products will be more specifically described.

The raw material preferably used is ilmenite, either mined as such or obtained as a by-product from the concentration of titanium bearing ore, as, for example, titanium bearing iron ores, vast deposits of which exist containing from 10 to 40% ilmenite, 25 to 80% magnetite and 5 to 50% gangue matter. An average composition of such ore is 36% ilmenite, 48% magnetite and 14% gangue matter.

The ore is crushed to pass a quarter inch mesh, and the product passed through magnetic separators, in which the greater part of the magnetite passes into the heads and the greater part of the ilmenite and gangue matter into the tails, the magnetite becoming available for use in blast furnaces for the production of pig iron. The ilmenite in the tails is found to be so separated from the gangue matter as to be readily recoverable by the well known method of jigging or tabling, whereby an ilmenite sufficiently pure for my process is obtained at a low cost from a heretofore waste product.

An approximate analysis of ilmenite so obtained has been 48.50% $TiO_2$; 36.64% $FeO$; 6.04% $Fe_2O_3$; .68% $Al_2O_3$; 3.70% $MgO$; 2.17% $SiO_2$; 2.17% undetermined.

The ilmenite is ground to a powder and mixed with an excess of carbonaceous matter. The carbonaceous matter is preferably a coking coal but other carbonaceous matter such as sawdust, coke, petroleum coke, and anthracite may be used. When a carbonaceous matter is used which does not of itself coke, I prefer to add such materials to it which when charred leave a spongy residue. I have found that glutrin, a substance obtained from the waste liquors in making sulphite wood pulp, is useful for this purpose. The mixture of pulverized ilmenite and coal is charged into retorts which are heated by external heat, the heat being preferably obtained from the gas produced by burning in gas producers the excess carbon which had been mixed with former charges to carbon monoxide and using such carbon monoxide by burning it around the retorts. The heat so applied drives off from the coal its volatile constituents in the form of gas which contains valuable by-products which may be recovered. The carbon combines with the oxygen of the iron oxides to form carbon monoxide which mixed with the combustible gas of the coal becomes available for heating, drying, etc., in the subsequent steps of the process. The products of combustion used to heat the retort leave the retort furnace at a high temperature and may be used to raise steam or for other purposes. The carbon and iron oxides react apparently in accordance with the following equations: $C+FeO=Fe+CO$; and $3C+Fe_2O_3=2Fe+3CO$.

The reaction leaves a spongy residue in the retort consisting essentially of metallic iron, titanium dioxide and carbon, together with gangue matter, and more or less unreduced or partially reduced iron oxides. This reaction product or residue is lixiviated or digested with a dilute solution of the liquid produced in one of the later steps of the process, the liquid being that remaining after the intermediate titanium compound is separated. This liquid consists essentially of dilute sulphuric acid carrying with it some ferrous sulphates and such small amounts of titanium sulphates as may have failed to decompose. The sulphuric acid reacts with the iron to form ferrous sulphate which passes into solution leaving a solid residue which is a titanium concentrate consisting of carbon, titanium dioxide, some undissolved iron and iron oxides, and the greater part of the gangue matter. This titantium concentrate is then separated from the solution, digested with strong sulphuric acid, whereby the titanium dioxide is converted into titanic and titanous sulphates and the iron into ferrous sulphate. The titanic and titanous sulphates and the ferrous sulphates are dissolved in water and then separated from the solid matter remaining. The solid matter remaining consists of carbon and the insoluble portions of the ilmenite. It is compressed while still damp into briquets which are dried and utilized for fuel. The ash from these briquets when pulverized may be used as a paint pigment. The titanium bearing solution is then heated which precipitates the titanium content as an impure modified metatitanic acid which is separated from the liquid. The residual liquid contains the sulphuric acid which was combined with the titanium and contains in the form of ferrous sulphate the iron which was not dissolved from the reaction product, together with such portions of the gangue matter as were more readily soluble and any small quantity of the titanium sulphate which failed to decompose. Part of this solution is used to dissolve the iron contained in the reaction product as hereinbefore described. The portion of the solution not so used, is concentrated, the free sulphuric acid recovered and the residue added to the ferrous sulphate solution, which is then boiled, whereby the residue is dissolved and the small quantity of titanium sulphate contained therein decomposed, the titanium separating as an impure metatitanic acid, which is separated from the solution and added to the titanium concentrate.

Referring now to the impure precipitate of modified metatitanic acid which was thrown down by heating the acid solution made after treating the titanium concentrate with the strong sulphuric acids:—This precipitate may be used as an article of manufacture and strongly heated to obtain crude titanium dioxide suitable for such purposes as making titanium electrodes, or this precipitate may be further purified. A further purification is had by digesting the precipitate with dilute hydrochloric acid to dissolve and thereby removing the small amount of basic iron sulphates contained. The precipitate is then freed from the hydrochloric acid solution.

The precipitate as thus purified may be dried and used as an article of manufacture. It is a soft opaque amorphous powder, white or of a creamy tint. This compound is apparently a modified metatitanic acid containing a small amount of combined $SO_3$. It differs from titanium dioxide in that it contains combined water, and from metatitanic acid in that it contains less combined water. This partially purified modified metatitanic acid may be used as an intermediate product, and still further purified to remove the decomposable combined sulphuric acid. When it is to be further purified, it is used damp as separated from the hydrochloric solution and further digested with a substance which has a stronger affinity for sulphuric acid than has basic titanic sulphate, to substantially free it from the remaining sulphuric acid compounds. There are many substances which may be used for this purification. I prefer, however, to use a substance which is soluble in water and whose resulting sulphates are also soluble, such a subtance being for example an alkaline hydrate or carbonate. The resulting purified product is a compound resembling metatitanic acid, which compound I term my modified metatitanic acid. It consists of titanic dioxide combined with some water, and free from iron and basic titanic sulphate. When this is heated to a temperature sufficient to expel a greater part of the combined water but not sufficient to render it hard and gritty, it becomes a soft amorphous exceedingly opaque product, white or having a delicate creamy tint, more suitable for pigments than titanium dioxide products heretofore produced.

The ferrous sulphate solution produced as a by-product is concentrated and run into crystallizing pans in which the ferrous sulphate crystallizes out of the mother liquor, and when separated from the mother liquor may be sold as the green vitriol of commerce. The mother liquor may be treated if desired for the recovery of magnesium sulphate by methods known to those skilled in this art.

The process is described in detail as follows:

Having obtained the ilmenite it is ground so that 75% or more passes a 150 mesh sieve. It is then mixed with pulverized bituminous coking coal in the proportions of about 100 parts of ilmenite to 30 parts of coal. No hard and fast rule can be given for the proportions of ilmenite and coal owing to variable quality of coals. The requirements are to have enough coal to furnish an excess of carbon to reduce the iron oxides to metallic iron and an excess sufficient to make a coke strong enough to permit easy lixiviation of the product but not so dense as to prevent the acid solution reaching all parts of the lumps into intimate contact with each particle of the ilmenite.

The mixture of pulverized coal and ilmenite is then charged into a retort. For this purpose, I prefer a retort of the type used in the production of illuminating gas by the continuous process, wherein the coal is charged as the coke produced is withdrawn, the coke being cooled in an extension of the retort to below its ignition temperature. The heat for such a retort may be furnished by the combustion of the gas produced in a gas producer. I have used a retort heated electrically by resistance. The coal and ilmenite mixture is charged as the reaction product is withdrawn, the withdrawals being so timed that the mixture remains in the heated zone of the retort for six hours or more. The bottom of the retort is sealed against ingress of air between withdrawals. The temperature within the retort is maintained approximately at 1200° C. during the operation. When the mixture comes into the heated zone the coal softens and gives off its volatile matter and when heated to about 750° C. the reduction of the iron monoxide begins, metallic iron forms and carbon monoxide gas is given off.

The reaction product as withdrawn from the retort consists of metallic iron, carbon, titanium dioxide, gangue matter and some coal ash. This reaction product is charged into lixiviation vessels preferably so arranged that the reaction product is first treated with a solution containing ferrous sulphate and almost free from free sulphuric acid and afterwards with solutions containing less ferrous sulphate and more free sulphuric acid. In practice I have used five solutions in the lixiviation of the reaction product. In the first four sulphuric acid was used and in the fifth water only, the wash water used in the fifth step being used to dilute the acid solution used in the fourth step. The acid solutions used are those produced at a later step in the process as a by-product, being the solutions separated from the crude modified metatitanic acid precipitate. Sufficient water is added to these solutions to reduce the free sulphuric acid content to about a nine or ten percent solution. The contents of the lixiviating vessels is preferably kept at a temperature between 60 and 80° centigrade. After washing with water the solid matter is drained as free from water as possible. This solid matter forms my titanium concentrate. An analysis on one occasion showed that after drying at 100° centigrade it had approximately the following composition:

57% $TiO_2$; 8.5% $Fe_2O_3$; 1.4% $Al_2O_3$; 4% MgO; .2% CaO; 22% carbon; 4% $SiO_2$; 1% volatile matter and water.

The solution contains the soluble iron as ferrous sulphate, together with a little silica and magnesia, and in the case analyzed also contained about 2.2% of the titanium dioxide charged, in combination as titanous sulphate. The solution also contains some of the titanium concentrate and the carbon in suspension. To this solution is added the solid residue left after concentrating and distilling that portion of the sulphuric acid which is not used to treat the concentrate. This solid residue consists of ferrous sulphate with a small amount of ferric and titanic sulphate, together with such portions of the gangue matter as passed into solution. The ferric sulphate is generally present in sufficient quantities to oxidize the titanous sulphate in the iron solution to titanic sulphate, and the ferrous sulphate in sufficient quantity to fully saturate the solution. The solution is then heated in an iron vessel to the boiling point whereupon the titanium content quickly precipitates as a crude metatitanic acid. Owing to the presence of gelatinous silica which acts as an agglomerant, the metatitanic acid, silica, carbon and undissolved concentrate which have passed through the lixiviating vessel settle rapidly. The clear solution is run into crystallizing pans in which the ferrous sulphate is recovered. In this way I recover about 90% of the iron contained in the ilmenite as green vitriol, a valuable article of commerce. The metatitanic acid is drained. The solution is added to the ferrous sulphate solution, the solid matter to the titanium concentrate.

Referring now to the titanium concentrate remaining after the acid lixiviation of the retort reaction product:

This titanium concentrate is brought into sulphuric acid solution preferably in two steps. The concentrate is charged into a lead lined digester into which is also run the sulphuric acid drained from the residue in the second step to be described.

The digester is a closed vessel capable of resisting pressure and so arranged that the contents may be stirred. A cylindrical vessel hung on trunnions and having internal baffles has been found suitable. The contents of the digester are heated, preferably by a gas flame which may be readily controlled, until the temperature of the contents reaches 165 to 175° centigrade, whereby the excessive water is expelled. The digester is left open up to this point, then the digester is closed and the heating continued under pressure until the temperature of the contents reaches 200 to 225° centigrade. During this heating the contents of the digester is stirred, preferably by rocking the digester. The heating at 200 to 225° centigrade is continued for about an hour, after which the contents are allowed to cool to about 100° centigrade or less, and the wash water from the treatment of a previous batch by the second step, to be hereafter described, is added and the stirring continued meanwhile. The product so obtained is removed from the digester and drained free from the solid matter. This solution contains the titanium content with the exception of such titanium content as may remain in the solid matter. The solution thus obtained has a specific gravity approximately 1.3. It consists essentially of titanic sulphate and ferrous sulphate, together with small quantities of magnesium and aluminum sulphate and silica. In some cases there is a small amount of titanous sulphate, while in other cases I have obtained solution free from titanous sulphate but containing small amounts of ferric sulphate. The digestion under pressure brings the iron into solution in its ferrous state, and thereby saves the cost of later reducing ferric to ferrous iron.

The solid matter remaining after the first step just described, is further treated to recover the remaining titanium content. This solid residue while still damp and containing 30 to 40% of water, is transferred to an iron vessel to which is added sufficient sulphuric acid to theoretically convert the iron, titanium, magnesium, and aluminum contained in the concentrate into sulphates. The mixture is gradually heated with occasional stirring to 200° centigrade or over, which temperature is held for sometime, about one-half hour generally being sufficient. By this means the greater part of the titanic dioxide and iron not converted into sulphates in the first step, are converted into sulphates and pass into the solution, together with a portion of the magnesia and alumina. Some of the silicates are decomposed, the silica becoming gelatinous. The acid is then drained from the solid matter, preferably on an asbestos suction filter. The sulphuric acid drained off is used in the first step of digesting the titanium concentrate. The solids are washed with water using about three and one-half times by volume of the sulphuric acid used. This is the wash water which is to be added during the first step just described to dissolve the sulphate formed by digesting a subsequent batch of concentrate. The solid matter remaining is pressed damp into briquets and dried. After drying the briquets to about 325° centigrade they were found by one analysis to have approximately the following composition: 5% volatile matter and water; 60% fixed carbon; and 35% ash.

The ash was about 8% by weight of the ilmenite and its composition was found to be in the case analyzed about 38.5% $SiO_2$; 48% $TiO_2$; 3.5% $Al_2O_3$; 8% $Fe_2O_3$ and 1.8% MgO. The ashe left after burning the briquets is a yellow brown powder, slightly gritty, which when ground with a drying oil forms a paint especially suitable for application to metallic surfaces.

In the first step is was found on one analysis that about 86% of the titanium content of the ilimenite passed into a solution, and in the second step about 6% passed into a solution, leaving about 8% undisolved in the residue. On other occasions I have obtained as high as 96% of titanium in the solution, leaving less than 4% in the residue.

Referring now to the sulphuric acid solution containing the titanium content digested from the titanium concentrate: If this solution contains titanous sulphate in excess, the greater part or all of it is oxidized to titanic sulphate, the titanic sulphate thus produced is normal titanic sulphate having the formula $Ti(SO_4)_2$. For this purpose the solution is aerated until the characteristic color of titanous sulphate has almost but not entirely disappeared. Air is used in preference to oxidizing chemicals on account of its lesser cost. If ferric sulphate is present it is reduced to ferrous sulphate, preferably by electrolysis, carrying the reduction to a point where traces of titanous sulphate show. A small quantity of sulphurous acid may be then added to be doubly sure of preventing any of the ferrous sulphate from being oxidized to ferric sulphate before the titanium compound is separated.

The solution is then preferably treated by the addition of one percent or more by volume of hydrochloric acid. I find that the addition of this small amount of hydrochloric acid tends to reduce the amount of basic iron sulphates and basic titanium sulphate precipitated in the next step in which the crude metatitanic acid is precipitated.

When heated to its normal boiling temperature the titanium content of this solution is not precipitated as a titanic hydrate or as a basic titanic sulphate. The titanium content is precipitated by heating the solution to above its normal boiling point.

The solution is then run into a lead vessel enclosed in a boiler containing a small quantity of water and heat is applied. When the air in the boiler is driven out by the steam, the boiler is closed and the heat continued until the pressure reaches about seventy pounds per square inch, corresponding to a temperature of about 162° centigrade. The heat is then continued for a sufficient time to make sure that the solution is heated to this point. Then the heat is withdrawn and the vessel and contents allowed to cool to 100° centigrade or less.

The titanium precipitates as my new titanium compound, which resembles metatitanic acid, and which I call my modified metatitanic acid. The temperature necessary for the decomposition of the titanic sulphate into sulphuric acid and my new titanium compound varies, being dependent upon the percentage of free sulphuric acid contained in the solution and the quantity of sulphuric acid set free by the titanic sulphate. For example, a titanic sulphate solution of 1.3 specific gravity containing .0792 grams $TiO_2$ and .0149 grams Fe per cubic centimeter was not completely decomposed when heated for two hours at 147° centigrade, but when a like solution was heated to 160° centigrade for thirty minutes, the titanium was completely separated from the solution. A like solution diluted with water to 1.1 specific gravity was completely freed from $TiO_2$ after heating for thirty minutes at 135° centigrade. It is to be understood therefore, that the above temperature may be varied to meet the conditions encountered.

Heretofore it has been customary to dilute the sulphuric acid solution of the titanium and afterwards to heat such dilute solution to its atmospheric boiling point. The dilution has been necessary in order to permit the precipitation to take place when so heated. The precipitate thus obtained by heating the dilute solution has been metatitanic acid. In my process instead of diluting the solution, I take the solution as formed by the previously described steps, which solution may have a specific gravity as high as 1.3, or even as high as 1.42, and heat such solution in the closed vessel above its atmospheric boiling point to precipitate the titanium content. The heating above the atmospheric boiling point permits a more concentrated solution to be employed than heretofore used, and thereby reduces the amount of solution to be heated to from one-fifteenth to one-eighth of that necessary under the former practice of using dilute solutions and heating them to the atmospheric boiling point. My process also results in the formation as the precipitate of my new titanium compound hereinafter described which has less combined water than the metatitanic acid heretofore precipitated by heating the dilute solutions.

The titanium compound is then separated from the liquid by filtration or otherwise. The compound when dried forms a soft opaque amorphous powder which is white or of a creamy tint when derived from solutions containing a large proportion of iron. An analysis of a typical sample of this compound showed it to contain .08% $Fe_2O_3$; 2.68% $SO_3$; 7.75% combined water and 89.59% $TiO_2$.

When this titanium compound is dried at 100° C., it has a definite composition ranging between 84 to 94% $TiO_2$, 1 to 5% $SO_3$, traces to 2% $Fe_2O_3$, and 4 to 10% $H_2O$.

This new titanium compound produced may be used as an article of manufacture, or it may be still further purified as hereinafter described. Also the following steps may be used to purify metatitanic acid or modified metatitanic acid produced by other processes, the steps of purification process not being dependent upon the specific process employed for producing the metatitanic or modified metatitanic acid.

Starting now with the modified metatitanic acid produced by the preceding process (or metatitanic acid produced by other processes), the modified metatitanic acid is first purified by hydrochloric acid treatment to remove iron impurities. The modified metatitanic acid compound is transferred while still damp into a hydrochloric acid resisting digester, and to it is added a small quantity of hydrochloric acid, 25% by volume of its liquid contents being ample, and if not already contained approximately 2% by volume of the liquid of sulphuric acid, sulphuric acid is added to make up this percentage. The material is then digested with occasional stirring at a temperature of about 80 to 100° centrigrade until the basic iron sulphates pass into the solution. The material during digestion is of the consistency of thick cream. During digestion I prefer to make successive additions of nitric acid to the amount of about ½ to 1% by volume of the hydrochloric acid used. The sulphuric acid is added to prevent titanium compound from becoming of a colloidal nature and the nitric acid is added to oxidize ferrous to ferric iron and to destroy any organic matter if present. The solid matter is then drained and washed with water until free from the dissolved iron. The compound so purified may be used as an article of manufacture, or may be still further purified as hereinafter described.

This compound is distinguished from titanium dioxide in that it contains more combined water, less $TiO_2$ and more $SO_3$ and is distinguished from metatitanic acid in that it contains more $TiO_2$ and less combined water. My belief is that it is essentially modified metatitanic acid containing 5 molecules of $TiO_2$ combined with one molecule of $H_2O$, a lesser quantity containing 5 molecules of $TiO_2$ and more than 1 molecule of $H_2O$, together with basic titanic sulphate in varying quantities and small amounts of impurities.

It is of especial value as an intermediate compound from which may be produced the titanium pigment or titanic dioxide hereinafter described.

The compound above described is next still further purified by the removal of combined sulphuric acid therefrom. The step now to be described of removing the combined sulphuric acid may be applied to a modified metatitanic acid produced by steps other than those hereinbefore specifically described, or may be applied to the purification of metatitanic acid, or to the purification of partially ignited metatitanic acid, that is metatitanic acid from which a portion but not all of its combined water has been expelled. The material to be purified is transferred to a digester capable of resisting pressure. If the material to be purified is my modified metatitanic acid compound, produced by the foregoing steps, it is transferred to the digester while still damp. Enough water is added to bring the material to a paste and then the substance that will combine with the sulphuric acid content is added. The sulphuric acid is believed to exist in the modified metatitanic acid combined as basic titanic sulphate. The treatment now described transfers the $SO_3$ contained in the basic titanic sulphate to the base of the purifying substance used. I find that there are a number of such purifying substances which may be used. For example, the alkaline hydrates, the more readily decomposable acetates, metallic oxides and hydroxides, many of the carbonates, such as those of sodium, potassium, lead, zinc calcium, etc., and the chlorides of the alkaline earths preferably in the presence of hydrochloric acid.

For the production of a white pigment I use only such of these substances as produce a soluble sulphate or a white insoluble sulphate. I find that certain of the substances are more active than the others, in that they will combine with a portion of the $SO_3$ at the temperatures obtainable at atmospheric pressures. I find, however, that to obtain a satisfactory result, it is preferable to conduct the digestion at temperatures above 100° centigrade. I find that caustic soda is a satisfactory purifying substance to use for this purpose. Enough water is added to the solids to make a paste of about the consistency of thick cream. Then a slight excess of the purifying substance such as caustic soda is added above the theoretical amount necessary to combine with the $SO_3$ present to form a sulphate of the substance added, for example, to form $Na_2SO_4$ when caustic soda is used. The digester is then closed and heat is applied until the temperature reaches about seventy pounds per square inch, at which pressure it is held for about two hours, for which time the material is continuously agitated. While the above pressure and time is preferred, no hard and fast rule can be given as to the heat and pressure necessary to complete the decomposition of the titanium sulphate, and it may be determined by trial for the particular conditions encountered. When the titanium compound acted on contains an excess of combined water, the water content is reduced during the above operation. After cooling, the solid matter is washed free from alkali and the sodium sulphate and then dried. By this treatment, when caustic soda is used, the basic titanic sulphate is decomposed apparently forming titanium dioxide, ortho titanic acid and soluble sodium sulphate, which is removed by the washing.

The resultant product of this purifying treatment is my modified metatitanic acid freed from the deleterious basic titanic sulphate. I believe that it consists essentially when dried at 100° centigrade, of titanium compounds containing 5 molecules of $TiO_2$ and 1 molecule of combined water, together with varying quantities of modified metatitanic acid containing more than 1 molecule of water. The impurities, if any, are insignificant amounts of $SiO_2$, $Al_2O_3$, $Fe_2O_3$, ortho titanic acid, $TiO_2$ and undecomposed basic titanic sulphate. It is a soft amorphous opaque powder free from gritty substances and in color white or of a delicate creamy tint.

It is distinguishable from metatitanic acid in that it contains less combined water and is distinguishable from pure titanic dioxide in that it contains combined water, is free from grit and is more readily soluble in sulphuric acid. When used as a pigment it has greater covering and hiding qualities than lead and zinc pigments. It is not poisonous, it is not discolored by sulphureted hydrogen and it will carry a larger proportion of inerts than will lead or zinc pigments.

My investigations lead me to believe that the basic titanic sulphate present in metatitanic acid, modified metatitanic acid, or partially ignited metatitanic acid, is of varying composition, a portion of it being so stable that it does not decompose when mixed with drying oils when applied as a paint, and another portion being unstable. The portion not removed by the aforesaid treatment, if any, is the stable portion.

The compound may be dried at a temperature of 100° centigrade and used as a pigment, or it may be heated to a temperature sufficient to decompose the metatitanic acid, driving off its combined water but not sufficient to render the titatanium dioxide thus produced hard and gritty. A temperature of between 550° to 600° centigrade is sufficient for this.

Referring now to the solution from which the modified metatitanic acid was separated by heating:—

In one typical case this solution was found to have a specific gravity of about 1.25. In addition to the diluting water used, it contains the sulphuric acid set free by the decomposition of the titanium sulphate, the excess of sulphuric acid used, the ferrous, aluminum and magnesium sulphates produced from the decomposition of the oxides of these elements present in the concentrate, any small amount of titanium sulphate which was not decomposed in the treatment, and a small amount of silica.

The solution not used for dissolving the iron in the reaction product I concentrate in lead pans to any desired strength. During the concentration the greater portion of the ferrous sulphate, together with some ferric sulphate produced by atmospheric oxidation, separate. The solution is drained into retorts and distilled. The sulphuric acid passing off is condensed and made available for further use. In previous methods used for the production of titanium dioxide, the sulphuric acid has been generally lost. By my method 85 to 90% is recovered and utilized in the production of useful products, such as green vitriol, which are recovered for future use. The solid matter remaining in the retort after distillation contains ferrous and ferric sulphate, the titanic sulphate which failed to separate from the solution and the greater part of the magnesium and aluminum sulphates, and some gelatinous silica. This solid matter is added to the iron solution. The sulphate of magnesium remaining in the mother liquor may be recovered if desired.

As will be readily appreciated by those skilled in this art, the process hereinbefore described produces a purer article and one better adapted for use than processes heretofore used. The general process heretofore used of making metatitanic acid has been to bring the titanium bearing materials into hydrochloric or sulphuric acid solution, then freeing the solution from excessive acid, reducing any iron to ferrous iron, diluting the solution until the titanium content does not exceed 1%, saturating the solution with a reducing chemical such as sulphurous acid, and boiling the solution for such time as is necessary to decompose the titanic sulphate, the resulting product being impure metatitanic acid, a solid and sulphuric acid in solution. A metatitanic acid derived from sulphuric acid solutions is always contaminated with basic titanic sulphate and with basic iron sulphate when iron sulphate is present in the solution. The proportion of these basic sulphates varies. Numerous analyses prove, however, that the $SO_3$ present reaches from 5 to 10% and the $Fe_2O_3$ present from a trace to 5%. The presence of $SO_3$ in metatitanic acid thus separated from sulphuric acid solutions, has long been known as is noted in "A system of quantitative chemical analysis" by Dr. C. Remigius Fresenius, John Wylie and Sons, New York, 1877, sec. 107, page 178. When this has been used in the preparation of titanium dioxide pigments it has been found that when mixed with drying oils and applied with a paint, the basic titanic sulphate gradually decomposes, setting free sulphuric acid, and the sulphuric acid in turn acts on the oil whereby the paint becomes discolored. It has been proposed to drive off the $SO_3$ by heat. When metatitanic acid containing this impurity is heated, it gives off the greater part of its combined water at a temperature before 450° centigrade. At 550° centigrade the basic sulphates begin to decompose, $SO_3$ being volatilized and $TiO_2$ remaining. The sulphates continue to be decomposed until the temperature reaches about 850° centigrade, at which there is little or no further decomposition by heat alone, although an appreciable quantity of $SO_3$ still remains. When the metatitanic acid is thus heated, it rapidly loses its pigment qualities about 600° centigrade by changing from a soft amorphous powder to a hard gritty substance, relatively unsuited for use as a pigment. On the other hand, when heated to a temperature which is sufficient to remove relatively all of the combined water but not all of the $SO_3$, if ground in oil, it will, if sufficiently free from iron, produce a paint which will be white when applied but gradually change color to a dirty yellow. This change in color I believe to be due to the action of the sulphuric acid set free by the decomposition of the basic titanic sulphate remaining.

Paint made from my modified metatitanic acid or from my titanic dioxide purified as hereinbefore described, is free from any deleterious amounts of basic titanic sulphate, and retains its original color. The pigment is free from any gritty matter and has as great, if not greater, hiding capacity than any paint heretofore known.

While the process has been fully and specifically described in all its steps. beginning with the treatment of the titanium bearing ore to the final purification, it is to be understood that the process is not limited to one having all of the steps specifically set forth, but that fewer number of steps may be applied. Also the proportions. temperatures, etc., may be varied as found desirable. It is to be understood, therefore, that the present invention is not limited to the details set forth in the foregoing description, but may be otherwise employed within the scope of the following claims.

I claim:

1. Those steps of the herein described process of treating titaniferous materials which consist in mixing an iron and titanium bearing material with carbonaceous material, heating the mixture to reduce contained iron to the metallic state, treating the reaction product thus obtained with an acid which dissolves the iron leaving the titanium content in the residue, digesting the residue with an acid of sufficient strength to dissolve the titanium content and forming a solution of the titanium content, and heating the solution to precipitate the titanium content, substantially as described.

2. Those steps in the herein described process of treating titaniferous materials which consist in mixing an iron and titanium bearing material with carbonaceous material which when charred leaves a spongy residue. heating the mixture to reduce the contained iron to a metallic state, and leaching the reaction product thus obtained with an acid which dissolves the iron and leaves the titanium content, substantially as described.

3. Those steps in the herein described process of treating titaniferous materials which consist in mixing an iron and titanium bearing material with carbonaceous material, heating the mixture to reduce contained iron to a metallic state, treating the reaction product thus obtained with an acid which dissolves the iron and leaves the titanium content in the residue, digesting the residue with strong sulphuric acid to dissolve the titanium content and forming a solution of the titanium content. heating the solution to precipitate the titanium content, treating the precipitate with dilute hydrochloric acid and with a substance which has a greater affinity for sulphuric acid than basic titanium sulphate, substantially as described.

4. Those steps in the herein described process of treating titaniferous materials which consist in purifying a hydrated titanium oxide by treating it with dilute hydrochloric acid. and thereafter treating it with a substance which has a greater affinity for sulphuric acid than basic titanium sulphate. substantially as described.

5. That step in the herein described process of treating titaniferous materials which consists in purifying a hydrated titanium oxide by treating it with a substance which has a greater affinity for sulphuric acid than basic titanium sulphate, substantially as described.

6. That step in the herein described process of treating titaniferous materials which consists in treating a titanium material having as an impurity a titanium sulphate with a substance which has sufficient affinity for sulphuric acid to break up the titanium sulphate and combine with the sulphuric acid, substantially as described.

7. Those steps in the herein described process of treating titaniferous materials which consist in forming an acid solution containing titanium and some iron impurities. heating the solution to precipitate the titanium content and treating the precipitate with dilute hydrochloric acid to dissolve the iron contained in the precipitate. substantially as described.

8. Those steps in the herein described process of treating titaniferous material which consist in forming an acid titaniferous solution, precipitating the titanium content from such solution, and treating the precipitate with a substance which combines with such acid as may be combined with the precipitate, substantially as described.

9. Those steps in the herein described process of treating titaniferous materials which consist in forming a sulphuric acid titaniferous solution, precipitating the titanium content from such solution, and treating the precipitate with a substance which has a greater affinity for sulphuric acid than basic titanium sulphate, substantially as described.

10. Those steps in the herein described process of treating titaniferous materials which consist in digesting a titanium bearing material with strong sulphuric acid and then treating the mixture with water to form a dilute sulphuric acid titaniferous solution, heating the solution to precipitate the titanium content as a hydrated titanium oxide, and thereafter treating the precipitated hydrated titanium oxide with a dilute acid which will dissolve iron impurities in the precipitate but leaves the hydrated titanium oxide substantially unaffected, substantially as described.

11. That step in the herein described process of treating titaniferous materials which consists in heating a titaniferous solution containing an excess of free acid under pressure so as to precipitate the titanium content as a modified metatitanic acid, substantially as described.

12. That step in the herein described process of treating titaniferous materials which consists in forming a titaniferous acid solution of such concentration that the titanium would not be precipitated by heating the solution to its atmospheric boiling point, and in heating such solution under pressure to above its atmospheric boiling point so as to precipitate the titanium content, substantially as described.

13. That step in the herein described process of treating titaniferous materials which consists in heating a titaniferous sulphuric acid solution having a specific gravity of at least 1.1 under pressure to above its atmospheric boiling point so as to precipitate the titanium content, substantially as described.

14. That step in the herein described process of treating titaniferous materials which consists in heating under pressure and to above its atmospheric boiling point a solution of titanium sulphate containing an excess of sulphuric acid so as to precipitate the titanium content as a hydrated titanium oxide containing less combined water than metatitanic acid, substantially as described.

15. Those steps in the herein described process of treating titaniferous materials which consist in forming a solution of titanium containing an excess of free acid, and then heating the solution under pressure and in such a manner as to precipitate the titanium content, substantially as described.

16. Those steps in the herein described process of treating titaniferous materials which consist in forming a titaniferous reaction product containing metallic iron, treating such reaction product with acid to dissolve the iron, digesting the residue with acid to dissolve the titanium content, treating this solution to precipitate the titanium content therefrom, and using the acid solution from which the titanium content was precipitated to treat a fresh batch of the reaction product, substantially as described.

17. Those steps in the herein described process of treating titaniferous materials which consist in forming a titaniferous reaction product containing reduced metallic iron, treating this reaction product with sulphuric acid to dissolve the reduced iron, digesting the residue with strong sulphuric acid to dissolve the titanium content, thereafter so manipulating this titaniferous solution as to precipitate the titanium content therefrom, and using the waste sulphuric acid solution from which the titaniferous content has been precipitated to treat a fresh batch of the reaction product, substantially as described.

18. Those steps in the herein described process of treating titaniferous materials which consist in purifying a hydrated titanium oxide of combined sulphuric acid, and thereafter heating the purified hydrated titanium oxide to drive off the combined water, substantially as described.

19. That step in the herein described process of treating titaniferous materials which consists in digesting a ferruginous titaniferous material with strong sulphuric acid under heat and pressure in a closed vessel whereby the titanium content is dissolved and the iron content is dissolved as ferrous sulphate, substantially as described.

20. That step in the herein described process of treating titaniferous materials which consists in digesting a ferruginous titaniferous material with acid under heat and pressure in a closed vessel so as to dissolve the titanium content and also bring the iron content into solution in its ferrous state, substantially as described.

21. Those steps in the herein described process of treating titaniferous materials, which consist in mixing a titaniferous material containing iron oxides with a carbonaceous material, treating the mixture by heating it so as to reduce the containing iron to a metallic state but without changing the chemical combination of the titanium, and leaching the reaction product thus obtained with an acid which dissolves the iron but leaves the titanium content, substantially as described.

22. That step in the herein described process of treating titaniferous materials which consists in heating a solution of titanium sulphate containing free acid and substantially free from ferric salts to a temperature above its normal boiling point so as to precipitate the titanium content, substantially as described.

23. That step in the herein described process of treating titaniferous materials which consists in heating a solution of titanium sulphate substantially free from ferric salts and containing hydrochloric acid and a reducing agent to above its normal boiling point, so as to precipitate the titanium content, substantially as described.

24. That step in the herein described process of treating titaniferous materials, which consists in heating a titanium solution which contains some titanous sulphate to a temperature above its normal boiling point so as to precipitate the titanium content, substantially as described.

25. As a new article of manufacture, a white amorphous powder consisting of a hydrated titanium oxide containing less than 10% of combined water, substantially as described.

26. As a new article of manufacture, a hydrated titanium oxide containing less than 10% of combined water, substantially as described.

27. As a new article of manufacture, a hydrated titanium oxide containing less than 10% of combined water and substantially free from combined sulphuric acid, substantially as described.

28. As a new article of manufacture, a hydrated titanium oxide containing less than 10% of combined water and substantially free from iron and combined sulphuric acid, substantially as described.

29. That step in the herein described process of treating titaniferous materials which consists in forming a sulphuric acid titaniferous solution, precipitating the titanium content from such solution, purifying the precipitate of combined sulphuric acid by treating it with a substance which has a greater affinity for sulphuric acid than basic titanium sulphate, and thereafter heating the purified precipitate to drive off the combined water, substantially as described.

30. That step in the herein described process of treating titaniferous material, which consists in heating a titanic sulphate solution above its normal boiling point so as to precipitate the titanium content, substantially as described.

31. That step in the herein described process of treating titaniferous material, which consists in heating a titanic sulphate solution containing some titanous sulphate to a temperature above its normal boiling point so as to precipitate the titanium content, substantially as described.

32. Those steps in the herein described process of treating titaniferous materials, which consist in adding a reducing agent to a titanic sulphate solution and then heating the solution above its normal boiling point so as to precipitate the titanium content, substantially as described.

33. Those steps in the herein described process of treating titaniferous materials, which consist in adding hydrochloric acid to a titanic sulphate solution and heating the solution above its normal boiling point so as to precipitate the titanium content, substantially as described.

34. Those steps in the herein described process of treating titaniferous materials, which consist in adding hydrochloric acid and a reducing agent to a titanic sulphate solution, and heating the solution above its normal boiling point so as to precipitate the titanium content, substantially as described.

35. That step in the herein described process of treating titaniferous materials, which consists in heating a titanium solution which will not precipitate at its normal boiling temperature to a temperature above its normal boiling point so as to precipitate the titanium content, substantially as described.

36. As a new article of manufacture, a titanium compound consisting essentially of five molecules of $TiO_2$ combined with not more than three molecules of $H_2O$, substantially as described.

37. As a new article of manufacture, an amorphous powder consisting essentially of five molecules of $TiO_2$ combined with not more than two molecules of $H_2O$, substantially as described.

38. As a new article of manufacture, a hydrated titanium oxide containing not more than 3% $SO_3$, substantially as described.

39. As a new article of manufacture, a pigment for paints consisting essentially of a hydrated-titanium oxide containing not more than 10% of water in combination, substantially as described.

40. As a new article of manufacture, a pigment for paints consisting of an opaque amorphous white powder consisting essentially of five molecules of $TiO_2$ combined with not more than three molecules of $H_2O$ to form a hydrate, substantially as described.

In testimony whereof I have hereunto set my hand.

FRANK E. BACHMAN.